(12) United States Patent
Fortier et al.

(10) Patent No.: US 10,539,743 B2
(45) Date of Patent: Jan. 21, 2020

(54) FIBER ATTACH ASSEMBLY AND TEST AUTOMATION

(71) Applicant: International Business Machines Corporation, Armonk, NY (US)

(72) Inventors: Paul F. Fortier, Richelieu (CA); Barnim Alexander Janta-Polczynski, Shefford (CA); Stephan L. Martel, Bromont (CA); Dany Minier, Granby (CA)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 15/206,341

(22) Filed: Jul. 11, 2016

(65) Prior Publication Data
US 2018/0011250 A1 Jan. 11, 2018

(51) Int. Cl.
*G02B 6/13* (2006.01)
*G02B 6/36* (2006.01)

(52) U.S. Cl.
CPC ............ *G02B 6/13* (2013.01); *G02B 6/3652* (2013.01)

(58) Field of Classification Search
CPC ...... G02B 6/13; G02B 5/3652; G02B 6/3608; G01R 31/308
See application file for complete search history.

(56) References Cited

U.S. PATENT DOCUMENTS

| 2002/0131729 | A1 | 9/2002 | Higgins, III |
| 2014/0043050 | A1 | 2/2014 | Stone et al. |
| 2014/0210354 | A1 | 7/2014 | Tan et al. |
| 2015/0063747 | A1 | 3/2015 | Chen et al. |
| 2015/0323753 | A1 | 11/2015 | Furuya et al. |

OTHER PUBLICATIONS

Wallace, John, "NIST researchers align multiple fibers to photonic chip simply", LaserFocusWorld®, Photonics Technologies & Solutions for Technical Professionals Worldwide, Apr. 29, 2015, Copyright © 2007-2015, PennWell Corporation, Tulsa, Ok, <http://www.laserfocusworld.com/articles/2015/04/nist-researchers-align-multiple-fibers-to-photonic-chip-simply.html>, 3 pages.
"Silicon Nanophotonic Packaging", IBM, Our People, Fiber Assembly, <http://researcher.watson.ibm.com/researcher/view_group_subpage.php?id=6424>, printed Jan. 11, 2016, 3 pages.

*Primary Examiner* — Mark A Osele
*Assistant Examiner* — Christopher C Caillouet
(74) *Attorney, Agent, or Firm* — Stephen R. Yoder; Gilbert Harmon, Jr.

(57) ABSTRACT

An approach compatible with high volume manufacturing for assembling a photonic chip with integrated optical fibers involving placing a die on an assembly station, providing one or more optical fibers, placing the one or more optical fibers into corresponding one or more grooves of the die, bonding the one or more optical fibers to the die and performing an optical test of the die using the one or more optical fibers, and severing the one or more optical fibers. The die can be removed from the assembly station while retaining a predetermined length of each severed optical fiber and the one or more optical fibers can be prepared for assembly to a next die.

13 Claims, 6 Drawing Sheets

FIBER ATTACH ASSEMBLY AND TEST AUTOMATION

BACKGROUND

The present invention relates generally to the field of photonic chips, and more particularly to photonic chip assembly with integrated optical fibers.

Photonic chips are microchip devices, e.g., dies, for optical communication, computing and/or sensing comprising a substrate material made of one or more elements such as, but not limited to, silicon, acting as an optical medium for transmitting light. The substrate material is precisely patterned during manufacture to act as an optical circuit. For example, an optical circuit may direct light through a die for transferring data to various optical, electro-optical and/or electronic components integrated on the die or other dies.

SUMMARY

According to one embodiment of the present invention, a method for assembling a photonic chip with integrated optical fibers is provided, the method comprising providing a die; providing one or more optical fibers; placing the one or more optical fibers into corresponding one or more grooves of the die; bonding the one or more optical fibers to the die; performing an electrical and optical test of the die using the one or more optical fibers; and severing the one or more optical fibers. A corresponding computer system and computer program product are also disclosed herein.

DETAILED DESCRIPTION

Embodiments of the present invention recognize that a cost effective, time efficient system and procedure is needed for automated, high throughput assembly and testing of photonic chips. Presently, some assembly schemes exist wherein connectors for optical and/or electrical testing are attached to photonic chips and the connectors are removed from the fibers prior to shipment of the chips. However, attaching and removing connectors can be a costly and time consuming approach. An assembly process is therefore provided herein which can assemble and test photonic chips simultaneously without the need for optical connectors or other post assembly optical test techniques such as splicing or light injection, etc.

Embodiments of the present invention incorporate one or more fiber rolls which provide one or more optical fibers for attachment to photonic chips during assembly. For optical testing to be performed during chip assembly, a light source such as, but not limited to, a laser, can be attached to a first fiber roll and optically coupled to a first end of a first optical fiber, associated with the first fiber roll, for providing a continuously connected light source for optical testing even as the first optical fiber unrolls from the first fiber roll. In some embodiments, a detector, e.g., a photodetector, can be coupled to an end of a fiber on a fiber roll for performing an optical test.

The one or more optical fibers comprising the one or more fiber rolls can be interconnected with a photonic chip. The interconnection provides a continuously connected feedback loop through the fiber rolls to be employed for the purpose of loopback optical testing performed during chip assembly, as will be subsequently discussed in greater detail.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
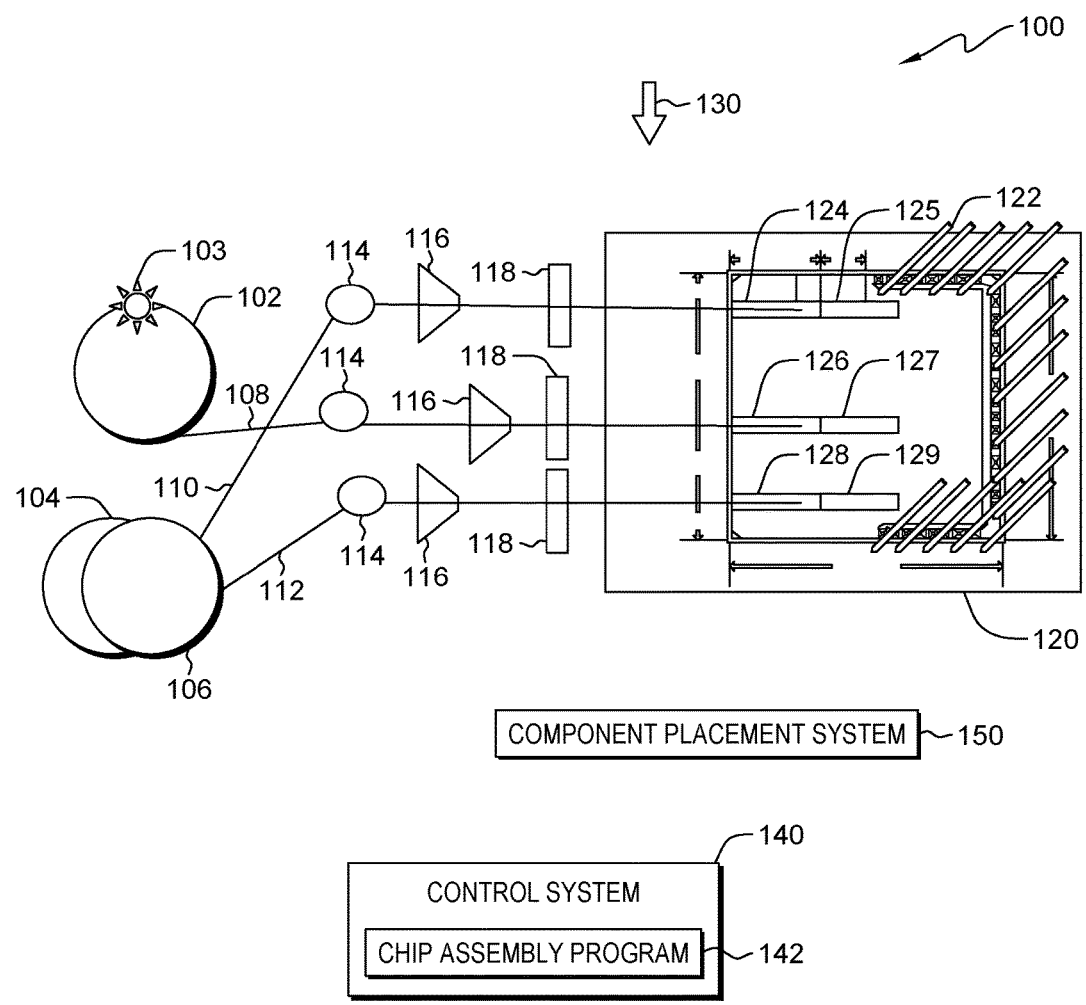
FIG. 1 is a functional block diagram illustrating a chip assembly and test system, in accordance with at least one embodiment of the present invention.

The present invention will now be described in detail with reference to the figures. FIG. 1 is a depiction of chip assembly and test system 100, in accordance with an embodiment of the present invention. It should be noted that the elements diagrammed in FIG. 1 are not necessarily drawn to scale. As depicted, chip assembly and test system 100 comprises fiber rolls 102, 104 and 106 with respective optical fibers 108, 110 and 112 attached to photonic chip 120. It is worth noting that in general, there can be any number of fiber rolls and associated optical fibers depending on how the present invention is being embodied. Light source 103, e.g., a laser, is mounted to fiber roll 102 for providing a continuous light connection to photonic chip 120 to be used for optical testing. Fiber roll 102 is capable of unrolling and feeding optical fiber 108 with light source 103 attached.

It should be noted that light source 103 can be powered by various means, such as with a removable battery pack connected to light source 103, wireless power transmission (e.g., electromagnetic induction), physical electrical contact over a circular rotating pad, or other means apparent to one of ordinary skill in the art.

Chip assembly and test system 100 further comprises control system 140 comprising chip assembly program 142, configurable for controlling the assembly and testing of photonic chip 120. Control system 140 can further be operatively connected to any components diagrammed and/or described herein. Control system 140 can be a laptop computer, tablet computer, netbook computer, personal computer (PC), a desktop computer, or another programmable electronic device and may include internal and external hardware components, as depicted and described in further detail with respect to FIG. 6.

Photonic chip 120 can be a die selected by component placement system 150 from a diced wafer, wherein component placement system 150 can be, but is not limited to, a pick and place machine. Photonic chip 120 may comprise one or more paths (e.g., electrically conductive surfaces) for electrical testing and communications with control system 140 via electrical probes 122. The depicted photonic chip 120 also comprises grooves 124, 126 and 128, which can be for example, but are not limited to, v-grooves. In general, photonic chip 120 can have any number of grooves. Mode converters 125, 127 and 129 are respectively disposed in grooves 124, 126 and 128, and can couple light between photonic chip 120 and optical fibers 108, 110 and 112. Mode converters 125, 127 and 129 are respectively coupled to waveguides associated with grooves 124, 126 and 128 for the conversion and transmission of light.

The depicted chip assembly and test system 100 further comprises feeding systems 114, position guiders 116, cleavers 118 and adhesive dispenser 130. Feeding systems 114 each comprise a plurality of pulleys and a tension feedback system for feeding optical fibers 108, 110 and 112 towards photonic chip 120. The tension feedback system can monitor and control the tension on the fibers, as will be subsequently discussed in greater detail with regard to FIG. 3. Position guiders 116 are mechanisms for placing optical fibers 108, 110 and 112 into grooves 126, 124 and 128, respectively. Position guiders 116 can be for example, but are not limited to, tubular collet chucks, such as will be subsequently described in greater detail with regard to FIGS. 3, 4A and 4B.

Cleavers 118 can be an implement used to cleanly sever optical fibers 108, 110 and 112 once they are attached to photonic chip 120, leaving a predetermined length of each fiber attached to the chip. Cleavers 118 also comprise a stripper element to remove fiber coatings in preparation for assembly to the next chip. Further, in preparation for assembly to the next chip, cleavers 118 can sever the optical fibers to properly align with the mode converters. Adhesive dispenser 130 is used for bonding optical fibers 108, 110 and 112 to photonic chip 120 and can further represent any number of adhesive dispensers.

Figure 2:
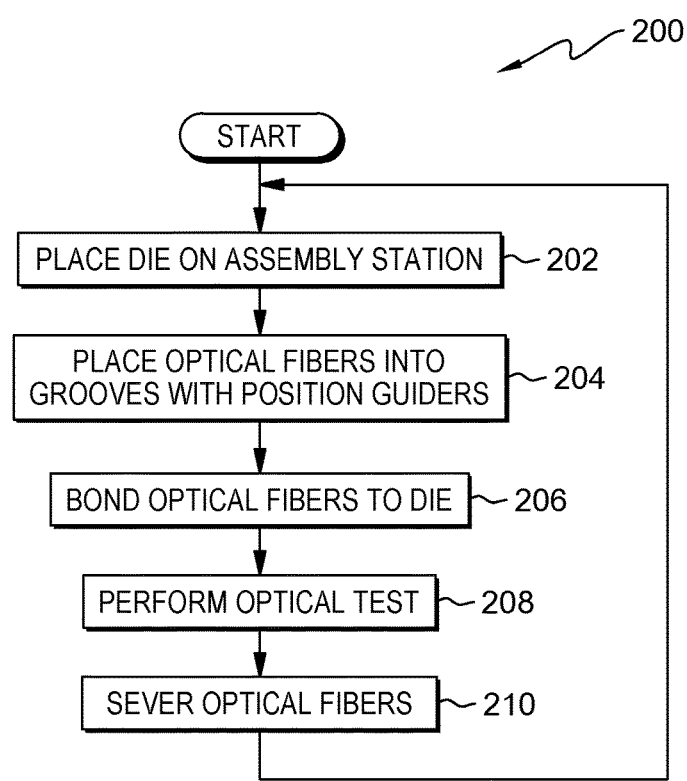
FIG. 2 is a flowchart depicting operational steps of the chip assembly and test system, in accordance with at least one embodiment of the present invention.

FIG. 2 is a flowchart 200 depicting operational steps of chip assembly and test system 100 shown in FIG. 1, in accordance with at least one embodiment of the present invention. Component placement system 150 (which can be connected to and controlled by control system 140) selects a die, e.g., photonic chip 120, from a diced wafer and places the die on an assembly station (not shown) (step 202). Electrical probes 122, operatively connected to control system 140, may be moved or lowered to make contact with one or more paths of the die. Electrical probes 122 can provide power to the die and enable an electrical test of the die. Electrical probes 122 can also be used for communications between control system 140 and a device under test, e.g., the die.

Position guiders 116 place optical fibers 108, 110 and 112 into grooves 126, 124 and 128, respectively (step 204). Prior to placement, the ends of optical fibers 108, 110 and 112 can be prepared for attachment, e.g., stripped and cleaned, by various means apparent to one of ordinary skill in the art. Optical fibers 108, 110 and 112, held by position guiders 116 for placement, may be fed from fiber rolls 102, 104 and 106 via feeding systems 114. Position guiders 116 can be mounted on stages. Each stage may comprise one or more actuators for moving the chuck (as depicted and described with respect to FIG. 3). The stages may be operatively connected to control system 140.

Optical fibers 108, 110 and 112 are bonded to the die (step 206) via adhesive dispenser 130 which dispenses an adhesive material into grooves 124, 126 and 128. One or more fiber lids can be used to press optical fibers 108, 110 and 112 into grooves 124, 126 and 128, wherein the cores of the fibers are butted to mode converters 125, 127 and 129. Pressing the optical fibers into the grooves results in a passive self-alignment of the fibers with a high degree of placement accuracy (e.g., 1-2 µm), enabling the use of a lower precision fiber placement stage to coarsely pre-align the fibers to the grooves and the passive self-alignment perform the higher placement accuracy. A high degree of placement accuracy is critical for single mode optics and enables optically coupling the fibers to the die with lower loss of transmitted light. In some embodiments, the one or more fiber lids are transparent to ultraviolet (UV) light and the adhesive material is cured with UV light. Curing with UV light enables a secure attachment of the fibers and fiber lids to the die. The adhesive material can have specific mechanical and optical properties to reach the desired functionality and performance reliability.

An optical test of the die may be performed by an optical test system (not shown), wherein light from light source 103 is used for the optical test (step 208). The optical test system can be partially or wholly realized by components (e.g., optical, electrical and/or electro-optical components) of the photonic chip 120 via self-testing. Light source 103 may be optically coupled to a first end of optical fiber 108 (associated with fiber roll 102) and provide light to the die when optical fiber 108 is disposed in groove 126 and a second end of optical fiber 108 is butted mode converter 127. It should be noted that light from light source 103 can in this way travel the entire length of optical fiber 108 on fiber roll 102. Alternatively, a photodetector (not shown) can be mounted to a fiber roll, e.g., fiber roll 102, and optically coupled to an associated optical fiber. The photodetector can be communicatively coupled to control system 140 and used to perform an optical test of light received from a photonic device.

A feedback loop comprising fiber rolls 104 and 106 can be used for the optical test of the die, wherein fiber rolls 104 and 106 are optically connected and attached for unrolling at the same rate to enable the fiber feed. A first end of optical fiber 110 (associated with fiber roll 104) can be optically coupled, e.g., spliced, to a first end of optical fiber 112 (associated with fiber roll 106).

For an optical test, the optical test system can generate an optical test signal with light from light source 103 and transmit the optical test signal through the feedback loop via optical fiber 110 in groove 124 with a second end of optical fiber 110 butted to mode converter 125. The optical test signal transmitted through the feedback loop can be received by photonic chip 120 via optical fiber 112 in groove 128 (with a second end of optical fiber 112 butted to mode converter 129) and compared, by the optical test system, to the test signal that was generated.

Embodiments of the present invention offer the advantage of an assembly process wherein an optical test can be performed during the assembly of optical interconnects, such as during the curing of the adhesive. This offers a time saving solution for the assembly of photonic chip 120, making efficient use of the assembly equipment and without requiring the use of fiber connectors or any related techniques.

Embodiments of the present invention further enable a passive self-alignment with an in-line test strategy for providing a fully tested and assembled photonic device at a lower cost than alternative approaches. Passive self-alignment (e.g., achieved by pressing optical fibers into the grooves) can achieve a high degree of placement accuracy without the need for high precision placement equipment and/or an active alignment technique.

It should be noted that chip assembly program 142 can sort photonic chip 120 by grade, e.g., high grade, low grade, etc., based, for example, on data received from photonic chip 120. Photonic chip 120 can be sorted by grade based on the results of an electrical test, an optical test and/or other information, e.g., an intensity of transmitted light detected by a photodetector component comprising photonic chip 120. As an example, if a received optical test signal is determined to be substantially the same (e.g., at least 95% the same) as a generated optical test signal, photonic chip 120 can be sorted into a high grade category. Further, data received from photonic chip 120 during assembly and testing can provide key performance parameters for live feedback and manufacturing line quality and yield control. Chip assembly program 142 can dynamically adjust the assembly and test process based on data received from photonic chip 120.

Cleavers 118 sever optical fibers 108, 110 and 112, wherein a predetermined length of each severed fiber is retained by the die (step 210). In some embodiments, cleavers 118 can be mounted to stages (not shown), comprising one or more actuators for moving cleavers 118. The stages can be operatively connected to control system 140. In some embodiments, cleavers 118 can be high precision cutting lasers. In other embodiments, cleavers 118 are diamond blades with bending features to perform the sever. Electrical probes 122 can lift away from the one or more paths and the die can be removed from the assembly station, e.g., by component placement system 150.

Figure 3:
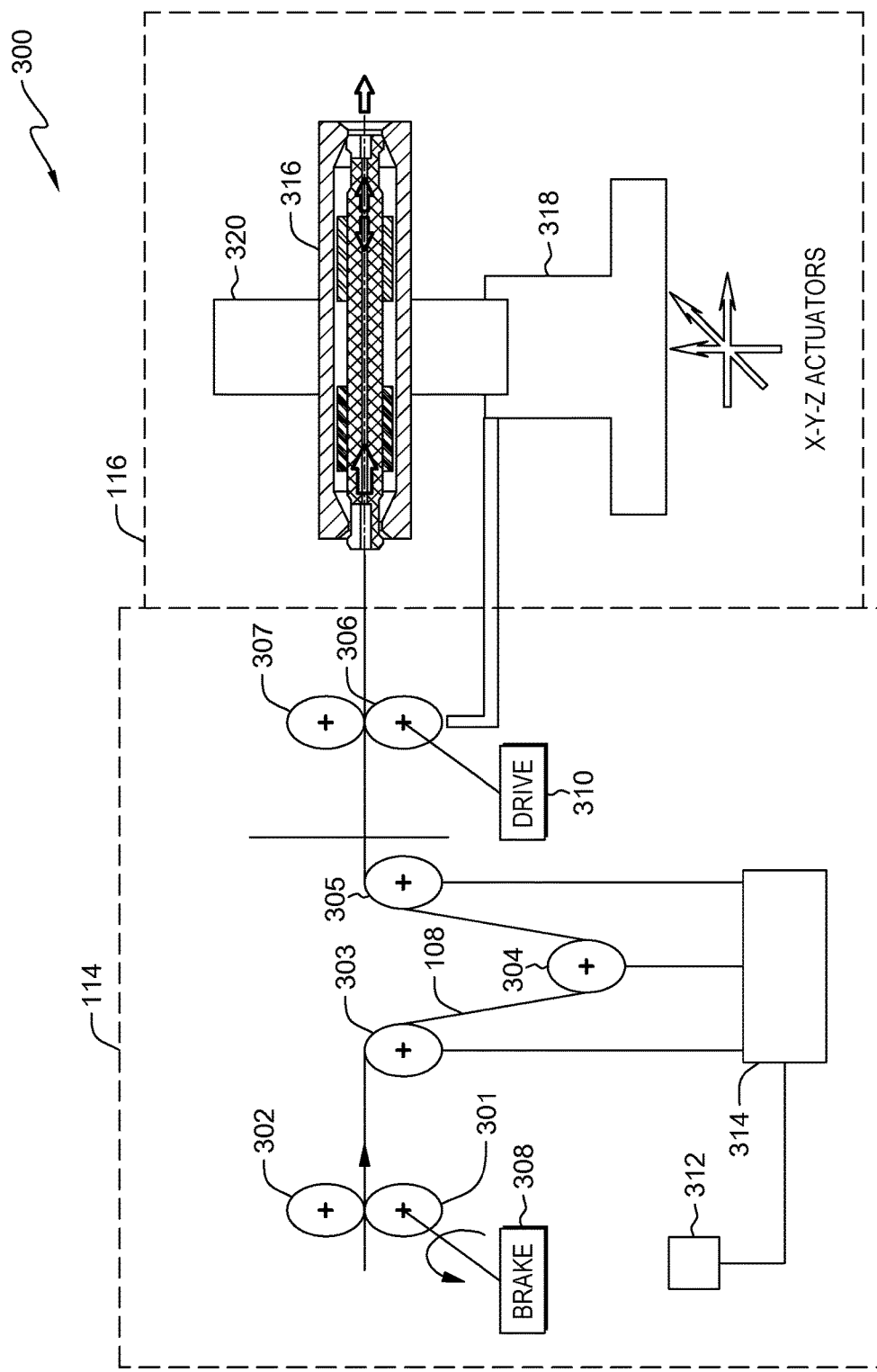
FIG. 3 depicts a detailed diagram of a feeding system and a position guider comprising the chip assembly and test system, in accordance with at least one embodiment of the present invention.

FIG. 3 is a diagram 300 of feeding systems 114 and position guiders 116 shown in FIG. 1, in accordance with an embodiment of the present invention. For feeding optical fiber 108 towards the die, feeding systems 114 comprise pulleys 301-307, brake 308, driver 310, tension meter 314 and feedback controller 312. It should be noted that the use of components of feeding systems 114 for monitoring and controlling tension on an optical fiber, e.g., optical fiber 108, can be referred to as a tension feedback system for low tension control. The tension feedback system can be, but is not limit to, a dancer control system. It should be further noted that in general, there can be any number of pulleys comprising feeding systems 114.

Position guiders 116 comprise tubular collet chuck 316 mounted to a stage 318 comprising one or more actuators for moving the chuck, e.g., three dimensionally, via chuck holder 320. Stage 318 can be operatively connected to control system 140 from FIG. 1.

Tension meter 314 can be, but is not limited to, a load cell sensor, and is connected to pulleys 303, 304 and 305 for monitoring the tension on optical fiber 108. Tension meter 314 is communicatively coupled to feedback controller 312. Feedback controller 312 can contain a microprocessor and can be configured to adjust the tension on optical fiber 108 to maintain a constant tension (e.g., a preconfigured tension) or to maintain a tension within a configurable threshold. Feedback controller 312 can be operatively connected to brake 308 (e.g., an electromagnetic brake) and driver 310 for controlling the feed, e.g., an unrolling, of optical fiber 108, thereby adjusting the tension on optical fiber 108. Additionally or alternatively, the tension on optical fiber 108 can be adjusted by raising or lowering pulley 304.

Figure 4A:
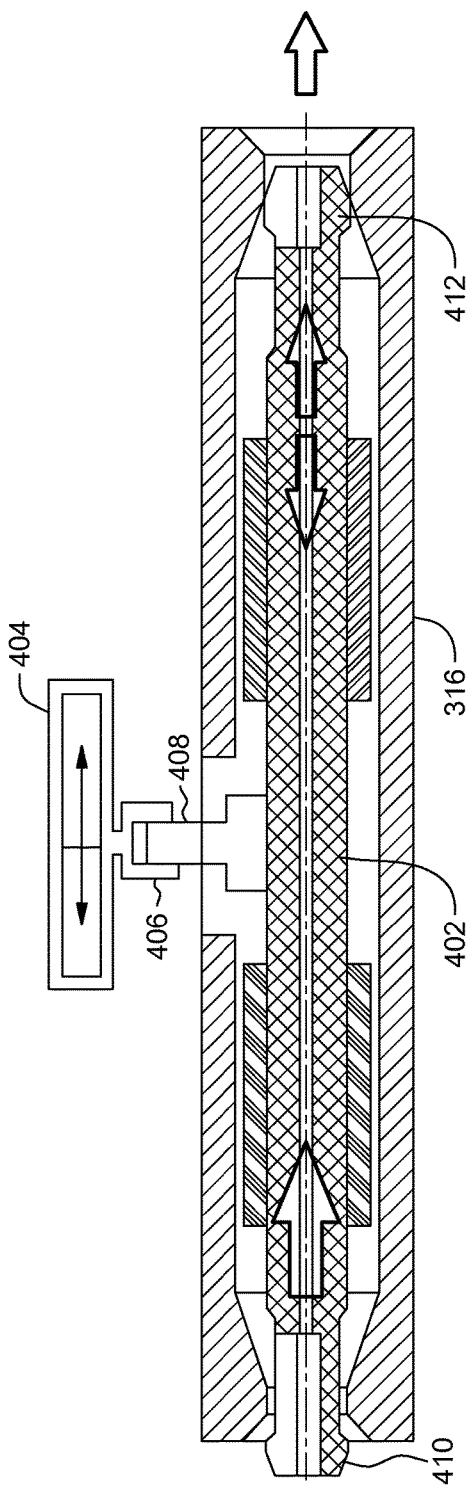
FIGS. 4A-4B are a cross sectional diagram depicting components of the position guider and an edge view of a tubular collet chuck, respectively, in accordance with at least one embodiment of the present invention.

FIG. 4A is a cross sectional diagram of tubular collet chuck 316 as shown in FIG. 3, in accordance with an embodiment of the present invention. Tubular collet chuck 316 comprises shaft 402 and collets 410 and 412. An optical fiber can be held in a cavity along the length of shaft 402. Actuator 404 is operatively connected to shaft 402 via link 408, wherein clevis 406 is attached to link 408, e.g., with a clevis pin. Actuator 404 can be an electric motor and can move shaft 402 in one dimension, e.g., back and forth, wherein collets 410 and 412 will open and close in opposition to one another based on the movement of shaft 402. For example, moving shaft 402 forward, i.e., to the right, can cause collet 410 to open (loosening the grip of collet 410 on an optical fiber) while collet 412 is simultaneously closing (tightening the grip of collet 412 on an optical fiber). This can result in an incremental movement forward of an optical fiber, e.g., towards photonic chip 120. Actuator 404 is operatively connected to chuck holder 320, shown in FIG. 3

In some embodiments, if an optical fiber is butted to a mode converter, tubular collet chuck 316 can be designed so that the fiber slips within it while the incremental movement is attempted. In this way, the optical fiber is maintained at the butted position with a controlled force application on the mode converter.

It should be noted that according to some embodiments, position guiders 116 can be communicatively coupled to force feedback sensors (not shown), e.g., load cell sensors, for monitoring butting forces of optical fibers 108, 110 and 112 against mode converters 125, 127 and 129. The force feedback sensors can be connected to an optical fiber at both ends of tubular collet chuck 316. The force feedback sensors can be calibrated to threshold force limits associated with mode converters 125, 127 and 129. This can prevent a placement (by position guiders 116) of optical fibers 108, 110 and 112 into grooves 124, 126 and 128 wherein the butting force against the mode converters exceeds the threshold force limits.

Figure 4B:
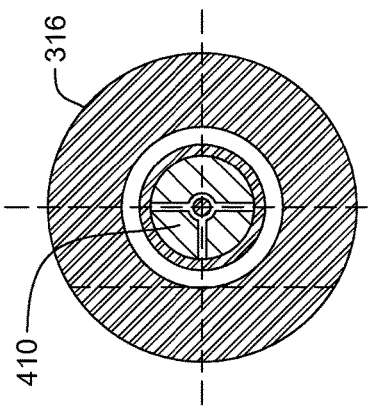

FIG. 4B depicts an edge view of tubular collet chuck 316 comprising position guiders 116, in accordance with an embodiment of the present invention. Collet 410 comprises a plurality of jaws and is connected to shaft 402. Responsive to a movement of shaft 402, the jaws can close or open for respectively clamping or releasing an optical fiber.

Figure 5:
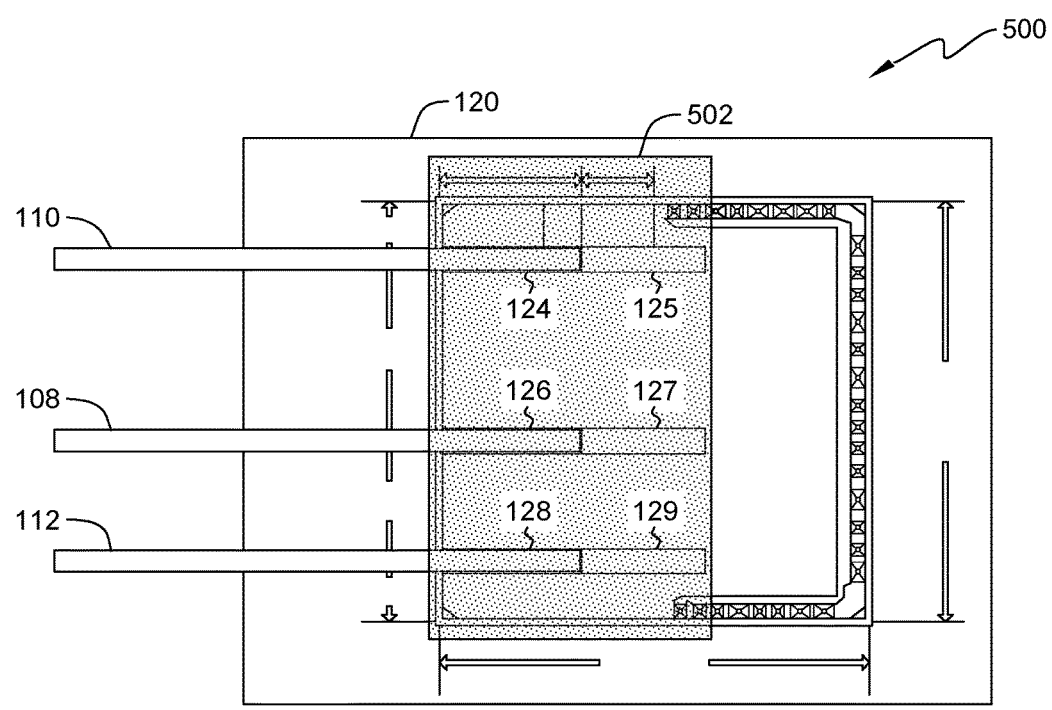
FIG. 5 illustrates an assembled photonic chip, in accordance with at least one embodiment of the present invention.

FIG. 5 depicts an assembled photonic chip 500, in accordance with an embodiment of the present invention. Photonic chip 120 has been fully assembled and tested, wherein optical fibers 108, 110 and 112 have been severed and a predetermined length of each is retained by photonic chip 120. Fiber lid 502 is secured to photonic chip 102 and presses optical fibers 108, 110 and 112 into grooves 126, 124 and 128, respectively, for a passive self-alignment of the optical fibers.

Figure 6:
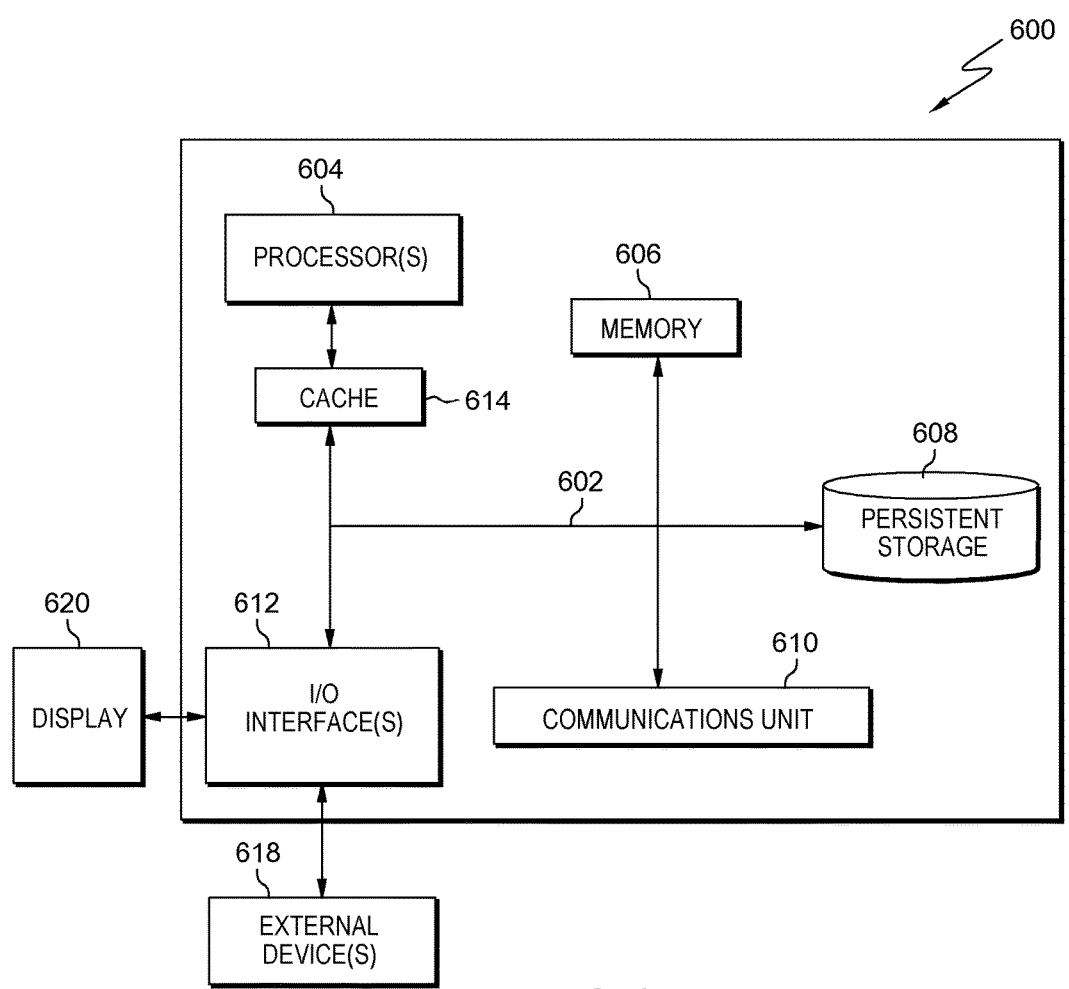
FIG. 6 is a block diagram of components of a control system controlling the chip assembly and test system, in accordance with at least one embodiment of the present invention.

FIG. 6 depicts a block diagram 600 of components of control system 140 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Control system 140 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Chip assembly program 142 can be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 can provide communications through the use of either or both physical and wireless communications links. Chip assembly program 142 can be downloaded to persistent storage 608 through communications unit 610.

I/O interface(s) 612 allows for input and output of data with other devices that can be connected to control system 140. For example, I/O interface 612 can provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., chip assembly program 142, can be stored on such portable computer readable storage media and can be loaded onto persistent storage 608 via I/O interface(s) 612. I/O interface(s) 612 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for assembling a photonic chip with integrated optical fibers, the method comprising:
   providing an assembly station for assembling the photonic chip;
   providing a die;
   providing one or more optical fibers;
   placing the one or more optical fibers into corresponding one or more grooves of the die by one or more position guiders comprising one or more tubular collet chucks operatively connected to one or more stages comprising one or more actuators for moving the one or more tubular collet chucks;
   bonding the one or more optical fibers to the die;
   performing an optical test of the die using the one or more optical fibers; and
   severing the one or more optical fibers.

2. The method of claim 1, wherein the die is selected from a diced wafer and placed on an assembly station.

3. The method of claim 1, further comprising:
   bringing a plurality of electric probes in contact with corresponding paths on the die for performing an electrical test, wherein one electrical probe is contacted per path.

4. The method of claim 1, further comprising:
   providing a feeding system comprising a plurality of pulleys, through which the one or more optical fibers are fed, and a tension feedback system for monitoring and controlling tension on the one or more optical fibers.

5. The method of claim 1, wherein bonding the one or more optical fibers to the die comprises dispensing an adhesive material into the one or more grooves.

6. The method of claim 5, wherein the adhesive material is cured with ultraviolet light.

7. The method of claim 1, further comprising:
   providing one or more fiber rolls comprising the one or more optical fibers; and
   pressing the one or more optical fibers into the one or more grooves with one or more lids for a passive self-alignment, wherein the one or more optical fibers are butted to corresponding one or more mode converters disposed in the one or more grooves.

8. The method of claim 7, wherein the one or more lids are transparent to ultraviolet light.

9. The method of claim 7, wherein at least one of a laser and a detector is mounted to a first fiber roll of the one or more fiber rolls and used to perform the optical test.

10. The method of claim 9, wherein the laser is optically coupled to a first end of a first optical fiber, associated with the first fiber roll, for providing a continuous light connection to the die via a first groove associated with the first optical fiber.

11. The method of claim 10, wherein a first end of a second optical fiber, associated with a second fiber roll, is optically coupled to a first end of a third optical fiber, associated with a third fiber roll, forming a feedback loop for performing the optical test on both the second optical fiber and the third optical fiber.

12. The method of claim 11, wherein the optical test comprises generating an optical test signal with light from the laser, transmitting the optical test signal through the feedback loop via the second optical fiber, receiving the optical test signal through a groove associated with the third optical fiber and comparing the optical test signal received to the optical test signal that was generated for a self-test.

13. The method of claim 1, further comprising:
   removing the die from the assembly station, wherein the die retains a predetermined length of each severed optical fiber attached to the die; and preparing the one or more fibers for assembly to a next die.

* * * * *